United States Patent
Lee et al.

(10) Patent No.: US 7,376,295 B2
(45) Date of Patent: May 20, 2008

(54) OPTO-ELECTRONIC PROCESSORS WITH RECONFIGURABLE CHIP-TO-CHIP OPTICAL INTERCONNECTIONS

(75) Inventors: Michael G. Lee, San Jose, CA (US); Kishio Yokouchi, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 260 days.

(21) Appl. No.: 10/946,264

(22) Filed: Sep. 20, 2004

(65) Prior Publication Data
US 2006/0062512 A1   Mar. 23, 2006

(51) Int. Cl.
*G02B 6/12* (2006.01)
*G02B 6/26* (2006.01)

(52) U.S. Cl. ............... 385/14; 385/15; 385/31; 385/88; 385/89

(58) Field of Classification Search ........... 385/14, 385/15, 88, 89, 31
See application file for complete search history.

(56) References Cited

U.S. PATENT DOCUMENTS

| | | | |
|---|---|---|---|
| 6,250,819 B1 * | 6/2001 | Porte et al. | 385/88 |
| 6,343,171 B1 * | 1/2002 | Yoshimura et al. | 385/50 |
| 6,400,855 B1 | 6/2002 | Li et al. | |
| 6,504,966 B2 | 1/2003 | Kato et al. | |
| 6,603,915 B2 | 8/2003 | Glebov et al. | |
| 6,611,635 B1 * | 8/2003 | Yoshimura et al. | 385/14 |
| 6,690,845 B1 | 2/2004 | Yoshimura et al. | |
| 6,823,097 B2 | 11/2004 | Glebov et al. | |
| 6,828,606 B2 | 12/2004 | Glebov | |
| 7,095,937 B2 * | 8/2006 | Murali | 385/131 |
| 2002/0114556 A1 | 8/2002 | Kato et al. | |
| 2003/0035614 A1 | 2/2003 | Glebov et al. | |
| 2003/0035632 A1 | 2/2003 | Glebov et al. | |
| 2003/0103712 A1 | 6/2003 | Glebov et al. | |
| 2003/0202732 A1 | 10/2003 | Glebov et al. | |
| 2003/0206675 A1 | 11/2003 | Glebov et al. | |
| 2004/0028316 A1 | 2/2004 | Yokouchi | |
| 2004/0126056 A1 | 7/2004 | Aoki et al. | |
| 2004/0126079 A1 | 7/2004 | Aoki et al. | |
| 2004/0206988 A1 | 10/2004 | Glebov | |

OTHER PUBLICATIONS

L. Dalton, et al., "Polymeric Electro-optic Modulators: From Chromophore Design to Integration with Semiconductor Very Large Scale Integration Electronics and Silica Fiber Optics," Ind. Eng. Chem. Res., Jan. 1999, pp. 8-33, vol. 38, No. 1.

S. Garner, et al., "Three-Dimensional Integrated Optics Using Polymers IEEE Journal of Quantum Electronics," Aug. 1999, pp. 1146-1155, vol. 35, No. 8.

Glebov, et al., "Two-dimensional microlens arrays in silica-on-silicon planar lightwave circuit technology," J. Microlith., Microfab., Microsyst., Oct. 2003, pp. 309-318, vol. 2 No. 4.

* cited by examiner

*Primary Examiner*—Frank G. Font
*Assistant Examiner*—James P. Hughes
(74) *Attorney, Agent, or Firm*—Baker Botts L.L.P.

(57) ABSTRACT

Disclosed are reconfigurable optical interconnections for opto-electronic processors in general, and for scalable computer architectures and scalable network servers in particular. The optical-signal interconnects are adaptable, or reconfigurable, during the normal operation of the processor. A large number of optical-signal interconnects may be provided among the components of the processor while using a small number of light transmitters and/or light receivers.

19 Claims, 4 Drawing Sheets

OPTO-ELECTRONIC PROCESSORS WITH RECONFIGURABLE CHIP-TO-CHIP OPTICAL INTERCONNECTIONS

FIELD OF THE INVENTION

The present invention relates to opto-electronic processors with chip-to-chip optical interconnections suitable for use in scalable computer architectures and scalable network servers. More particularly, the present invention relates, to opto-electronic processors with adaptable chip-to-chip optical interconnections.

BACKGROUND OF THE INVENTION

Mainstay computer systems and network-server systems use electrical interconnects among the integrated-circuit (IC) chips on the component boards, and electrical interconnects on bus-based interconnect planes to interconnect the component boards. The speed of communication in these systems is limited both by the well-known "skin effect," where resistance increases as signal frequency increases, and by capacitance effects. To overcome the resistance and capacitance of the electrical interconnects, more powerful bus drivers have been used. However, these drivers increase the power consumption of the system, and require additional cooling for the system.

Recently, there has been an explosive growth in the amount of information conveyed through the Internet, local networks, and high-speed data exchanges between servers. Current information processing systems and network servers are having difficulty keeping up with the growth, and are now running into the physical limits of the electronic components, electric interconnections, and assembly technologies.

The present invention is directed to addressing the ability of information processing systems and network servers to keep up with the growth of information communication, and to addressing the physical limits placed on systems by current electronic components, electric interconnections, and assembly technologies.

SUMMARY OF THE INVENTION

As part of making their invention, the inventors have recognized that the board-to-board electrical interconnects between component boards could be replaced by optical-signal interconnects. The propagation of optical signals is not limited by resistance, capacitance, or the skin effect, and a light beam only generates a small amount of heat dissipation due to light absorption in waveguides and the light receiver. However, the inventors have recognized that directly replacing each board-to-board electrical interconnect with an optical-signal interconnect would require a dedicated light transmitter device on one board, a dedicated light receiver device on another board, and a dedicated configuration of one or more optical waveguides between the light transmitter device and the light receiver device. Scalable-architecture computer systems and blade-type network servers have large numbers of board-to-board electrical interconnects, and thus the replacement of electrical interconnects with optical-signal interconnects would require large numbers of light transmitters and light receivers incorporated onto each component board. This would greatly increase the size and expense of each component board, calling into question the viability and cost-effectiveness of using optical-signal interconnects in scalable-architecture computer systems and blade-type network servers.

As a further part of making their invention, the inventors have discovered that many scalable-architecture computer systems and blade-type network servers have a relatively low utilization of their board-to-board electrical interconnects. That is, while each component board of such a system has several electrical interconnects to each of the other component boards, a much smaller number of the electrical interconnects are used at any one time. Moreover, when an electrical interconnect is used, it tends to be used intensely for a substantial period of time, and then goes idle for a substantial period of time before being used again.

As part of making their invention, the inventors have recognized that the implementation of board-to-board optical-signal interconnects can be made viable and cost-effective by using a smaller number of optical-signal interconnects (compared to the number of electrical interconnects being replaced), and by making the optical-signal interconnects adaptable, or reconfigurable, during the normal operation of the computer system or network server. As an example, instead of using three light transmitters on a component board to replace three board-to-board electrical interconnects to three other component boards, a single light transmitter is used, and its output is guided to one of three waveguides (or possibly two of three waveguides, or three of three waveguides) by an optical deflecting device that is under the control of the component board. Similarly, instead of using three light receivers on a component board to replace three board-to-board electrical interconnects to three other component boards, a single light receiver is used and its input is optically coupled to one of three waveguides by another optical deflecting device that is under the control of the component board.

Accordingly, a first exemplary embodiment of the present invention encompasses a processor that is suitable for use as a computer system, or a network server, or the like. The processor comprises at least a first IC chip, a second IC chip, and a third IC chip, each IC chip being mounted on a substrate, such as a component board. Usually, the IC chips are mounted on separate substrates, but two or more of the IC chips may be mounted on a common substrate. The IC chips perform tasks in support of the operation of the processor, the first IC chip generating a signal that is to be conveyed to either of the second and third IC chips. The processor further comprises a first light transmitter that receives a first electrical signal from the first IC chip, and that generates an optical signal at an optical output in relation to the first electrical signal. The first light transmitter may be integrated onto the first IC chip, or it may be integrated onto another chip. The processor further comprises a first light receiver having an optical input and generating a second electrical signal in relation to the amount of light received at its optical input. The second electrical signal is electrically coupled to the second IC chip, and the first light receiver may be integrated onto the second IC chip or another chip. The processor further comprises a second light receiver having an optical input and generating a third electrical signal in relation to the amount of light received at its optical input. The third electrical signal is electrically coupled to the third IC chip, and the second light receiver may be integrated onto the third IC chip or another chip. The processor further comprises an optical deflector having an optical input optically coupled to the optical output of the first light transmitter to receive an optical signal therefrom, a first optical output optically coupled to a first output waveguide that enables light to be conveyed to the first light receiver, a second optical output optically coupled to a second output waveguide that enables light to be conveyed to the second light receiver, and an electrical input that receives a first control signal in electrical form. The optical deflector couples the received optical signal more to the first output waveguide than the second output waveguide when the electrical control signal has a first state, and more to the second output waveguide than the first output waveguide when the electrical control signal has a second state. The optical deflector may be disposed on the same substrate as the first IC chip, or may be disposed on an optical interconnect board. The first control signal may be generated by any chip or component within the processor, and may be generated by the first IC chip or another chip located on the same substrate as the first IC chip.

In the above example, the reception of the light signals may be handled in a number of ways. In one configuration, each of the first and second light receivers may receive an optical signal from a single dedicated waveguide. In another case, each of the first and second light receivers may receive its optical signal from one of a plurality of waveguides that is adaptively selected during operation by an optical deflector similar to that described above. The latter configuration enables a large number of waveguides to be replaced by a smaller number of bus-type waveguides that are shared in a multiplexed manner.

A second exemplary embodiment of the present invention encompasses a processor that is suitable for use as a computer system, or a network server, or the like. The processor comprises at least a first IC chip, a second IC chip, and a third IC chip, each IC chip being mounted on a substrate, such as a component board. Usually, the IC chips are mounted on separate substrates, but two or more of the IC chips may be mounted on a common substrate. The IC chips perform tasks in support of the operation of the processor, the first IC chip receiving a signal in optical form that is conveyed from one of the second and third IC chips. The processor further comprises a first light receiver having an optical input and generating a first electrical signal in relation to the amount of light received at its optical input. The first electrical signal is electrically coupled to the first IC chip, and the first light receiver may be integrated onto either the first IC chip or another chip. The processor further comprises a first light transmitter that receives a second electrical signal from the second IC chip and generates an optical signal at an optical output in relation to the second electrical signal. The first light transmitter may be integrated onto the second IC chip, or it may be integrated onto another chip. The processor further comprises a second light transmitter that receives a third electrical signal from the third IC chip and generates an optical signal at an optical output in relation to the third electrical signal. The second light transmitter may be integrated onto the third IC chip, or it may be integrated onto another chip. The processor further comprises an optical deflector having a first optical input optically coupled to a waveguide that enables light to be conveyed from the first light transmitter, a second optical input optically coupled to a waveguide that enables light to be conveyed from the second light transmitter, an optical output optically coupled to the optical input of the first light receiver, and an electrical input that receives a first control signal in electrical form. The optical deflector further has a first optical coupling efficiency between its first optical input and its optical output, and a second optical coupling efficiency between its second optical input and its optical output. The first optical deflector makes the first optical coupling efficiency greater than the second optical coupling efficiency when the first control signal has a first state, and makes the second optical coupling efficiency greater than the first optical coupling efficiency when the first control signal has a second state. The optical deflector may be disposed on the same substrate as the first IC chip, or may be disposed on an optical interconnect board. The first control signal may be generated by any chip or component within the processor, and may be generated by the first IC chip or another chip located on the same substrate as the first IC chip.

In the above example, the transmission of the light signals may be handled in a number of ways. In one configuration, each of the first and second light transmitters couples its optical output to a single dedicated waveguide. In another case, like that of the first exemplary embodiment described above, each of the first and second light transmitters may couple its optical signal to one (or more) of a plurality of waveguides that is adaptively selected during operation by an optical deflector, as described above. The latter configuration enables a large number of waveguides to be replaced by a smaller number of bus-type waveguides that are shared in a multiplex manner.

Accordingly, it is an object of the present invention to enable scalable-architecture computers and network servers to process more information.

It is a further object of the present invention to provide a large number of optical-signal interconnects among component boards using a small number of light transmitters and/or light receivers.

It is a further object of the present invention to reduce the cost of implementing optical-signal interconnects in large processors.

These objects and others will become apparent to one of ordinary skill in the art from the present specification, claims, and attached drawings.

DETAILED DESCRIPTION OF THE INVENTION

Figure 1:
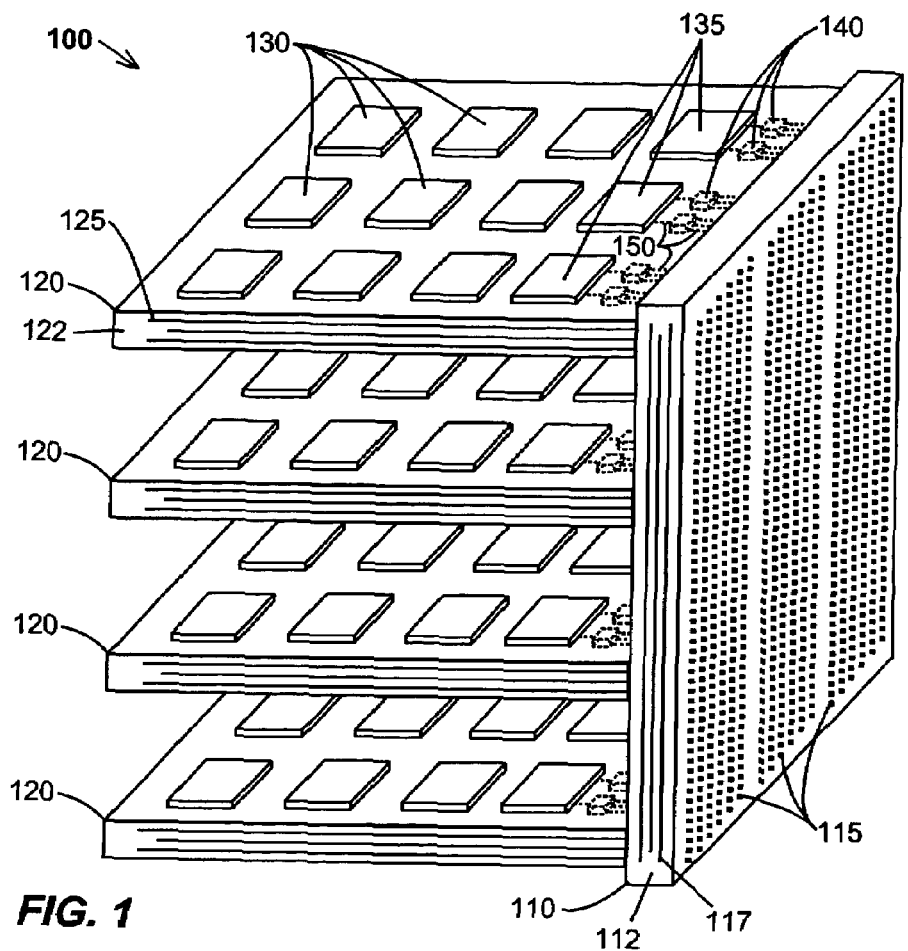
FIG. 1 shows a perspective view of an exemplary processor embodiment according to the present invention.

FIG. 1 shows a perspective view of a processor embodiment of the present invention at 100. Processor 100 comprises a plurality of component boards 120 mechanically coupled to a main optical backplane 110, preferably in a detachable manner. Optical signals are routed among component boards 120 as described below in greater detail. Component boards 120 may be component boards of any electro-optic-based system, such as daughter boards of a computer system or processor blades of a network server. A component board 120 comprises a base substrate 122, a plurality of integrated circuit chips (IC chips) 130, a plurality of opto-electric devices 135 formed on one or more chips, a network of electrical traces 125 formed in and/or on base substrate 122, a plurality of optical deflectors 140 formed on base substrate 122, and a plurality of optical waveguides 150 formed on base substrate 122. For visual clarity in FIG. 1, some of these elements and their reference numbers are omitted for the three lower boards 120. Main optical backplane 110 comprises a base substrate 112, a plurality of optical waveguides 115 formed on or near the top surface of substrate 112 to interconnect optical signals among component boards 120, and optionally a network of electrical traces to interconnect electrical signals among component boards 120, as explained below in greater detail.

The network of electrical traces 125 on each component board 120 electrically interconnects IC chips 130 to one another, and preferably interconnects selected IC chips to opto-electric devices 135 and optical deflectors 140. The IC chips 130 are interconnected by traces 125 according to the desired function performed by the chips and the system. Opto-electric devices 135, optical deflectors 140, waveguides 150, and waveguides 115 provide board-to-board optical-signal interconnections among component boards 120. Each opto-electric device 135 may comprise a light transmitter or a light receiver, and each chip of opto-electric devices 135 may comprise one or more light transmitters, one or more light receivers, or a combination of light transmitter(s) and light receiver(s). A signal generated in a first IC chip 130 on the top component board 120 may be optically communicated to a second IC chip 130 on a middle component board 120 in the following manner. The first IC chip 130 on the top component board 120 generates a first electrical information signal, which is electrically coupled to a first light transmitter device 135 located on the top component board 120. The first light transmitter device 135 converts the first electrical information signal to a first optical information signal, and couples it to a first deflector 140. The first deflector 140 then routes the first optical signal to a first waveguide 150 that will convey the optical signal to a first waveguide 115 on main optical backplane 110, which in turn will convey the optical signal to a first light receiver on the middle component board 120 for the second IC chip 130. Optical signals between waveguides 150 and 115 may be coupled by conventional mirrors or gratings formed in main optical backplane 110. The first deflector 140 receives a first control signal that instructs it to select the first waveguide 150 for routing the first optical signal to the first light receiver. The first control signal is generated by an electrical component of processor 100, such as an IC chip on the top component board 120, which can be the first IC chip 130.

On the middle component board 120, a second waveguide 150 receives the first optical signal from the first waveguide 115 of main optical backplane 110. Second waveguide 150 may convey the first optical signal directly to the first light receiver device 135 (which is located on a second chip of opto-electric devices 135 on the middle component board 120), or by way of a second deflector 140 located on the middle component board 120. In the first case, the first light receiver device 135 converts the optical signal to an electrical signal, which is then electrically coupled to the second IC chip 130. In the second case, the second deflector 140 selects the second waveguide 150 from a number of other waveguides 150 (which are optically coupled to other respective waveguides 115) before coupling it to the first light receiver device 135 for conversion. The second deflector 140 receives a second control signal that instructs it to select the second waveguide 150. The second control signal is generated by an electrical component of processor 100, such as an IC chip on the middle component board 120, which can be the second IC chip 130. The first and second control signals may be coordinated by sending control signals through one or more optical waveguides 115 that are dedicated to that purpose, or by sending control signals through optional electrical traces 117 of main optical backplane 110, which in turn are coupled to selected traces 125 on component boards 120.

In a similar manner, the first information signal generated by first IC chip 130 on the top component board 120 may be optically communicated to a third IC chip 130 on the bottom component board 120. As before, the first electrical information signal is electrically coupled to the first light transmitter device 135 located on the top component board 120, and the first light transmitter device converts the first electrical information signal to a first optical information signal and couples the latter to the first deflector 140. The first deflector 140 then routes the first optical signal to a third waveguide 150 that will convey the first optical signal to a second waveguide 115 on main optical backplane 110, which in turn will convey the first optical signal to a second light receiver device 135 on the bottom component board 120 for the third IC chip 130. The first control signal to the first deflector 140 instructs the deflector to select the third waveguide 150 instead of the first waveguide 150. On the bottom component board 120, a fourth waveguide 150 receives the first optical signal from the second waveguide 115 of main optical backplane 110. Fourth waveguide 150 may convey the first optical signal directly to the second light receiver device 135 (which is located on a third chip of opto-electric devices 135 on the bottom component board 120), or by way of a third deflector 140 located on the bottom component board 120. In the first case, the second light receiver device converts the optical signal to an electrical signal, which is then electrically coupled to the third IC chip 130. In the second case, the third deflector 140 selects the fourth waveguide 150 from a number of other waveguides 150 (which are optically coupled to other respective waveguides 115) before coupling it to the second light receiver device for conversion. The third deflector 140 receives a third control signal that instructs it to select the fourth waveguide 150. The third control signal is generated by an electrical component of processor 100, such as an IC chip on the bottom component board 120, which can be the third IC chip 130. The first and third control signals may be coordinated by sending control signals through one or more optical waveguides 115 that are dedicated to that purpose, or by sending control signals through optional electrical traces 117 of main optical backplane 110, which in turn are coupled to selected traces 125 on component boards 120.

In this manner, a first information signal generated from an IC chip 130 on top component board 120 can be optically transmitted to a selected chip on one of the other component boards by the coordination of the control signals. In a similar manner information signals generated by IC chips 130 on the other component boards 120 may be optically transmitted to top component board 120 and to the other component boards 120. For this, each component board has an array of light transmitters, an array of light receivers, and a plurality of optical deflectors 140 and waveguides 150. Exemplary arrangements of these components are provided below after exemplary embodiments of optical deflector 140 and waveguides 150 are described.

Figure 2:
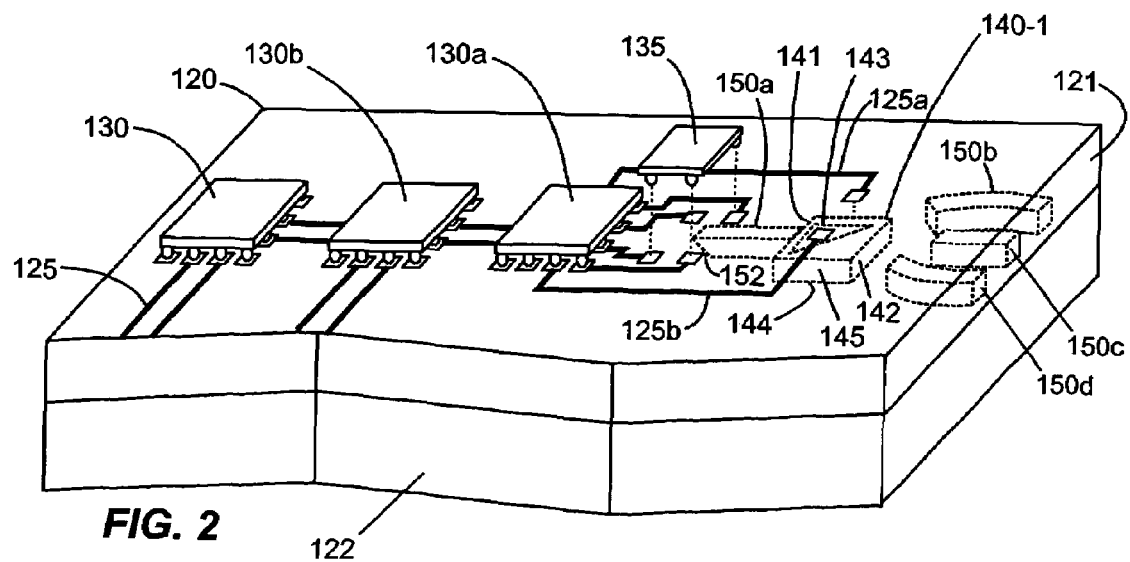
FIG. 2 shows a partial perspective view of a component board and a first exemplary optical deflector that may be used in the processor shown in FIG. 1 according to the present invention.

FIG. 2 shows a partial perspective view of component board 120 that shows the features of an exemplary embodiment 140-1 of deflector 140 and waveguides 150. For the purpose of visual clarity, the chip for opto-electric devices 135 is offset upwards from its normal position, as shown by the small vertical dashed lines below it. Component board 120 comprises a component layer 121 at the top of the board. Deflector 140-1 and four waveguides 150a-150d are embedded in layer 121. Waveguide 150a is disposed between the chip of opto-electric devices 135 and deflector 140-1, and has a first end disposed under the attachment area for the chip of opto-electric devices 135 and a second end disposed adjacent to deflector 140-1. A reflector 152 is disposed at the first end of waveguide 150a, and serves to couple light between waveguide 150a and an opto-electric device 135, which may be a light transmitter or a light receiver. (It is possible for reflector 152 to couple light between waveguide 150a on the one side, and a small number of opto-electric devices 135 on the other side closely grouped together on the chip). Deflector 140-1 is a prism-type deflector and comprises a first optical surface 141 facing towards the second end of waveguide 150a to couple light therewith, a second optical surface 142 located opposite to first optical surface 141 to couple light beams in or out of surface 142 at a plurality of directions, and a body 145 of opto-electric material disposed between first optical surface 141 and second optical surface 142. Three waveguides 150b-150d are disposed between second optical surface 142 and the attachment edge of component board 120 that attaches to main optical backplane 110. Deflector 140-1 is configured and operated to bend the light passing through it principally along three possible paths, and each of waveguides 150b-150d is located to couple light between itself and deflector 140-1 along a respective one of these paths.

More specifically, light may flow through deflector 140-1 in either direction along the three paths. In the case that a light transmitter is optically coupled to waveguide 150a (through reflector 152), light flows through waveguide 150a to deflector 140-1, and is then directed principally along one of the three paths by deflector 140-1 to one of waveguides 150b-150d. From there, the light is directed to main optical backplane 110. In this case, waveguide 150a may be called an input waveguide, and each of waveguides 150b-150d may be called an output waveguide. In the case that a light receiver is optically coupled to waveguide 150a, deflector 140-1 receives light at its second optical surface from at least one of the waveguides 150b-150d, deflects the path of the received light toward waveguide 150a. From there, the light propagates in waveguide 150a toward opto-electric device 135. In this case, waveguide 150a may be called an output waveguide, and each of waveguides 150b-150d may be called an input waveguide. Deflector 140-1 may also receive light at its second optical surface 142 from the other waveguides, but this light is deflected in a manner that prevents it from substantially entering waveguide 150a. Since light may flow in either direction in waveguides 150a-150d, they may be given the following more general names: inner coupling waveguide 150a (since it is located more toward the interior of component board 120), and outer coupling waveguides 150b-150d (since they are located at the attachment edge of component board 120).

Deflector 140-1 also comprises a top electrode 143 disposed on the top surface of opto-electric body 145, and preferably a bottom electrode 144 disposed on the bottom surface of opto-electric body 145. (In place of bottom electrode 144, an electrode may be formed on the top of substrate 122 or therein, below component layer 121.) Top electrode 143 comprises a polygon-shape having two non-parallel sides, one such side facing first optical surface 141 and inner waveguide 150a, and the other such side facing second optical surface 142 and the outer waveguides 150b-150d. A triangle is shown in the figure. If bottom electrode 144 is used, it preferably has the same shape as top electrode 143, and is aligned opposite to it. An electric field is established between electrodes 143 and 144 by applying a voltage between the electrodes through electrical traces 125a and 125b, which are coupled to electrodes 143 and 144, respectively, through respective vias. The electric field causes the portion of body 145 that is between the electrodes to undergo a change in refractive index, thereby creating a spatial change in refractive index that underlies each of the polygon sides of the electrodes. Because the two polygon sides facing optical surfaces 141 and 142 are not parallel, the spatial change in refractive index will cause bending of the light as it passes under each polygon side of electrode 143, substantially according to the well-known Snell's law. The result is a deflection of the light's path through deflector 140-1. The degree of deflection depends upon the change in refractive index, which in turn depends upon the polarity and the magnitude of the applied voltage. The workings of prism deflectors are known to the optics arts, and a detailed description thereof is not needed for one of ordinary skill in the optics art to make and use the present invention.

The material of body 145, the shape of electrodes 143 and 144, and the distances between second optical surface 142 and waveguides 150b-150d are preferably selected such that:
  1. light is principally coupled between deflector 140-1 and waveguide 150b when a voltage of +M (or alternatively −M) is applied between electrodes 143 and 144,
  2. light is principally coupled between deflector 140-1 and waveguide 150c when zero volts is applied between electrodes 143 and 144, and
  3. light is principally coupled between deflector 140-1 and waveguide 150d when a voltage of −M (or alternatively +M) is applied between electrodes 143 and 144.

M may have the value of 5 to 10 volts, given that recent polymer-based electro-optic materials have electro-optic coefficients of over 100 picometers per volt (for example, see the chromophoric organic electro-optic materials from Lumera, and U.S. Pat. No. 6,716,995). Instead of using the voltages +M, 0, and −M to set the beam deflection to select waveguides 150b-150d, one may use the voltages 0, +½M, +M, or 0, −½M, −M (i.e., all voltages of one polarity).

Figure 3:
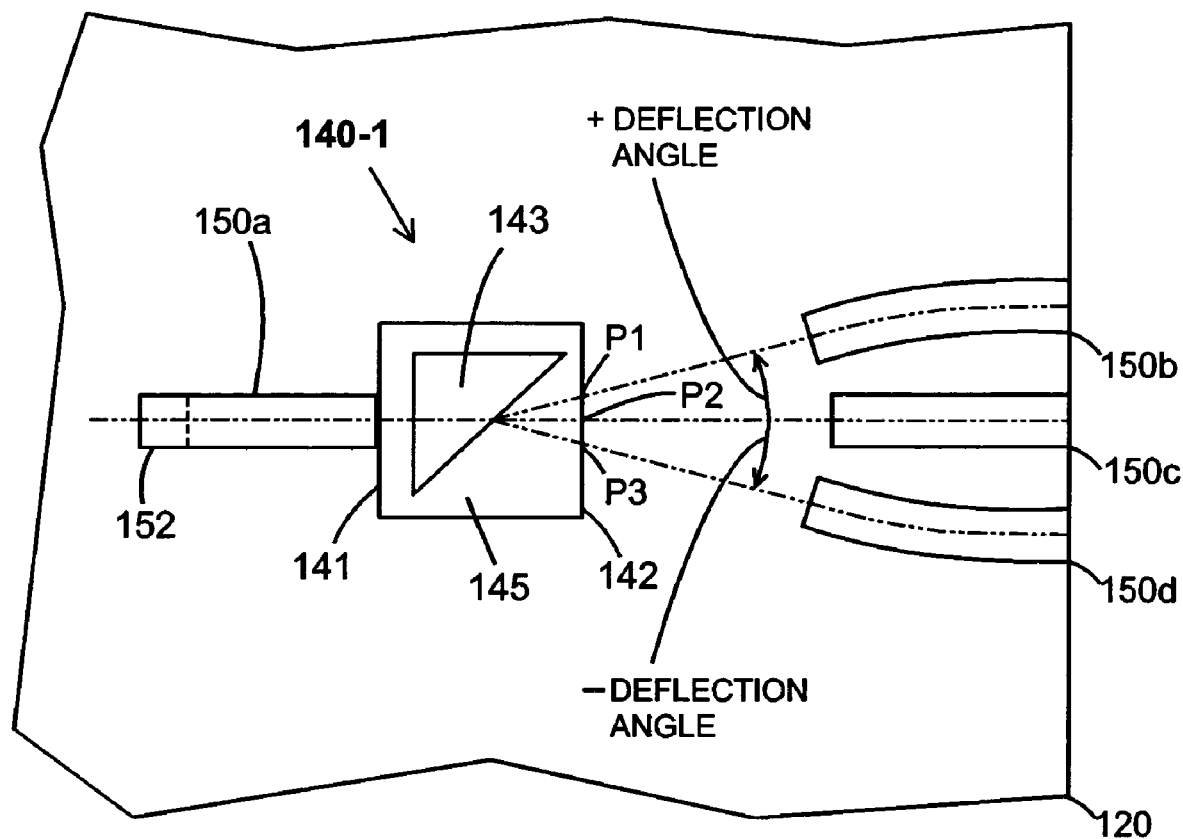
FIG. 3 shows a top plan view of the first exemplary optical deflector shown in FIG. 2 according to the present invention.

FIG. 3 shows a top plan view of deflector 140-1 and waveguides 150a-150d and the three optical paths that can be established between deflector 140-1 and waveguides 150b-150d. The deflection angle of the paths to waveguides 150b and 150d may be as small at 0.5 degrees in either direction. Waveguides 150b and 150d have small curvatures to aid in steering the deflected light back into a line substantially parallel with the optical axis of waveguide 150c. The curvature of waveguides 150b and 150d may be around 5 degrees. Waveguides 150a-150d and deflector 140-1 may be formed by conventional waveguide processing steps without undue experimentation.

When deflector 140-1 receives light from opto-electric device 135, first optical surface 141 provides an optical input for the deflector to receive an optical signal, and second optical surface 142 provides three optical outputs at the exit points of the three optical paths to waveguides 150b-150d, as shown at reference numbers P1, P2, and P3 in FIG. 3. The first control signal may have three states, each state to select a respective optical path and a respective optical output P1-P3. In the first state, deflector 140-1 couples the received optical signal more toward optical output P1 than to optical outputs P2 and P3, so that most of the optical signal goes to waveguide 150b. In the second state, deflector 140-1 couples the received optical signal more toward optical output P2 than to optical outputs P1 and P3, so that most of the optical signal goes to waveguide 150c. And in the third state, deflector 140-1 couples the received optical signal more toward optical output P3 than to optical outputs P1 and P2, so that most of the optical signal goes to waveguide 150d.

When deflector 140-1 conveys light to opto-electric device 135, first optical surface 141 provides an optical output for the deflector to output an optical signal, and second optical surface 142 provides three optical inputs at the entry points of the three optical paths from waveguides 150b-150d, again as shown at reference numbers P1, P2, and P3 in FIG. 3. The prism deflector provides a respective variable-coupling efficiency between each optical input P1-P3 and the optical output. Each of the coupling efficiencies changes as the voltage to electrode 143 is varied. The first control signal coupled to electrode 143 may have three states, one state to select a respective optical path and a respective optical input P1-P3 by increasing the coupling efficiency to that optical input with respect to the other coupling efficiencies. In the first state, deflector 140-1 makes the coupling efficiency to optical input P1 significantly greater than the coupling efficiencies to optical inputs P2 and P3. In the second state, deflector 140-1 makes the coupling efficiency to optical input P2 significantly greater than the coupling efficiencies to optical inputs P1 and P3. And in the third state, deflector 140-1 makes the coupling efficiency to optical input P3 significantly greater than the coupling efficiencies to optical inputs P1 and P2.

As a closing note to the discussion of FIGS. 2 and 3, the electo-optic device 135 indicated in FIG. 2 has its electrical terminals coupled to chip 130a by way of the electrical traces shown between chip 130a and the chip for device 135. If device 135 is a light transmitter, these traces provide the electrical signal that will be converted to the optical signal. If device 135 comprises a light receiver, these traces provide the electrical signal that has been converted from the optical signal.

Figure 4:
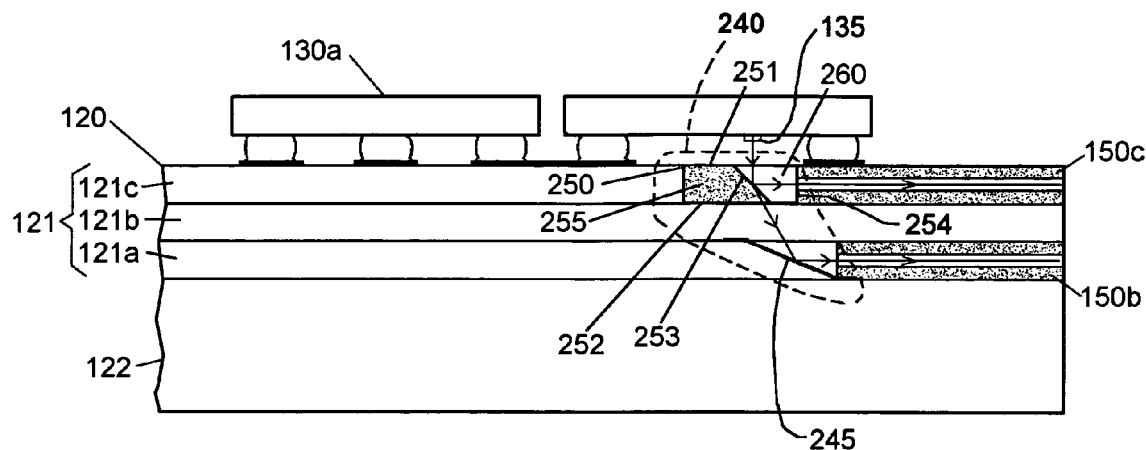
FIG. 4 shows a cross-sectional view of a second exemplary optical deflector that may be used in the processor shown in FIG. 1 according to the present invention.
Figure 5:
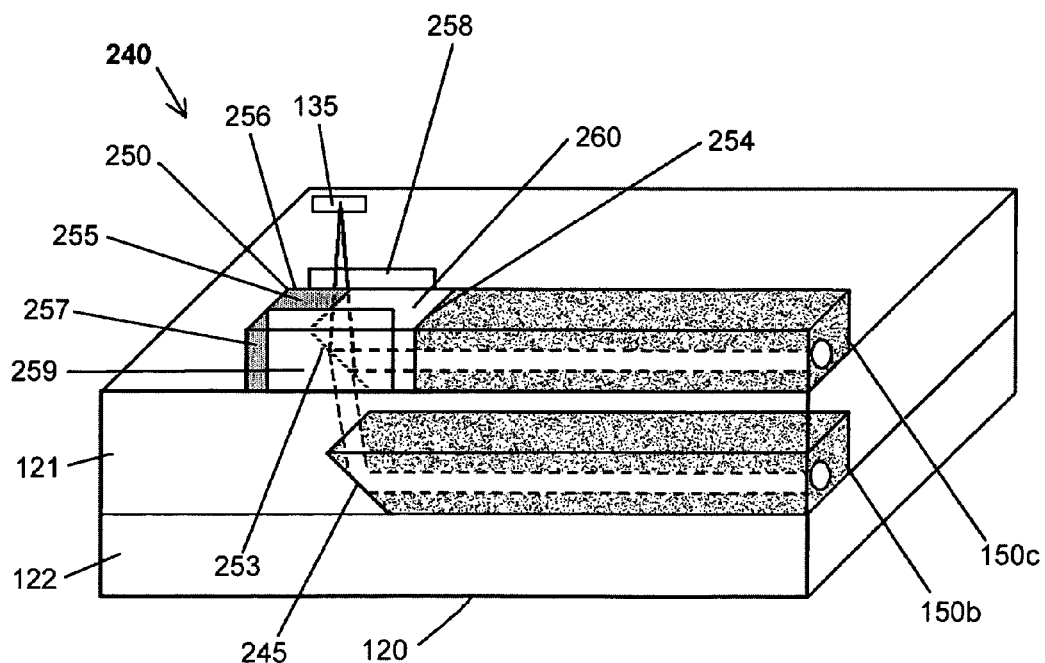
FIG. 5 shows a partial perspective view of the second exemplary optical deflector shown in FIG. 4 according to the present invention.

FIG. 4 shows a cross-sectional view of a second embodiment 240 of an exemplary optical deflector according to the present invention, and FIG. 5 shows a partial perspective view. Optical deflector 240 is useful when an optical signal is to be simultaneously transmitted to two IC chips, or to only one of two IC chips. Deflectors 240 and 140-1 may be used on the same substrate, and may be coupled in series (that is, an output of deflector 140-1 may be coupled to an input of deflector 240, and an output of deflector 240 may be coupled to an input of deflector 140-1). In optical deflector 240, inner waveguide 150a is not used, and two outer waveguides 150b and 150c are used. Waveguide 150c is disposed above waveguide 150b, with each having a first end disposed under or near the chip-holding device 135, and a second end disposed near the attachment edge of substrate 120 to main optical backplane 110. In the figures, the core bodies of waveguides 150b and 150c are shown with clear areas, and the cladding layers are shown with stippled-fill patterns. The waveguides are preferably disposed such that their core bodies are separated by ~15 microns or more for single mode waveguides, and by ~50 microns or more for multi-mode waveguides. A sub-layer 121b of component layer 121 described below can be used to provide the desired spacing distance (it preferably has a refractive index equal to or less than that of the cladding layers). While FIG. 5 shows the waveguide 150c being disposed above and directly over waveguide 150d in a parallel manner, it may be appreciated that waveguide 150c may still lie above waveguide 150d but be in a non-parallel relationship. As explained below, the construction of optical deflector 240 is based on Snell's law and the actions of total internal reflection, partial reflection, and partial transmission.

Optical deflector 240 comprises an angled reflector 245 and a variable reflector 250. Angled reflector 245 is disposed at the left end of waveguide 150b; it reflects light between the core body of waveguide 150b and the bottom surface of variable reflector 250. Angled reflector 245 preferably comprises a metal layer formed over a beveled side surface of a sub-layer 121a of component layer 121, the side surface being beveled with respect to the top surface of base substrate 122 and the top surface of component layer 121, and with respect to the optical propagation axis of waveguide 150b. As used herein, the adjective "beveled" means formed to a bevel angle with respect to a reference surface or reference line (e.g., an optical propagation axis of a waveguide), with the bevel angle being any angle except 90 degrees (right angle). Angled reflector 245 may be formed by the following sequence of processing steps: forming sub-layer 121a using a photo-imageable polymer; photo-exposing the sub-layer through a gray-scale mask that defines the beveled side surface; developing the exposed layer to form the beveled side surface; and then forming a metal layer over the beveled side surface. Thereafter, the layers of waveguide 150b may be formed, followed by the formation of sub-layer 121b, which acts as a planarizing layer as well as a spacer layer between waveguides 150b and 150c. In this way, the metal surface of angled reflector 245 makes an inclined angle with respect to the top surface of base substrate 122. It is also possible to make angled reflector 245 by the steps of: initially forming sub-layer 121a as a slab waveguide comprised of photo-imageable core and cladding layers having closely matched photo-chemistries; photo-exposing the slab waveguide through a gray-scale mask that defines both the beveled side surface and waveguide 150b; developing the exposed layer to form the beveled side surface and waveguide 150b; and then forming a metal layer over the beveled side surface.

Variable reflector 250 comprises a top surface 251 facing device 135, a bottom surface 252 facing towards the angled reflector 245, a first side surface 254 facing the first end of waveguide 150c, a body 255 of electro-optic material disposed between top surface 251 and bottom surface 252, and a body 260 of high-refractive index material disposed between top surface 251 and bottom surface 252 and adjacent to body 255 of electro-optic material. An interface surface 253 is disposed between bodies 255 and 260, and is beveled with respect to the top surface of base substrate 122, with respect to the top surface of component layer 121, and with respect to the optical propagation axis of waveguide 105c. In other words, interface surface 253 is formed to a bevel angle with respect to the top surfaces of substrate 122 and component layer 121, and the optical propagation axis of waveguide 105c, with the bevel angle being any angle except 90 degrees. Preferably, the bevel angle is within one or two degrees of 45 degrees (45°), and more preferably within a half-degree of 45 degrees. Interface surface 253 is preferably planar. The refractive index of body 260 is substantially greater than the intrinsic refractive index of body 250 of electro-optic material, preferably being at least 10% higher. As used herein, the intrinsic refractive index of an electro-optic material is the refractive index of the material when no electric field is present in the material. The refractive index of body 260 can also be higher than the intrinsic refractive index by 20% or more, 25% or more, and 35% or more.

FIG. 5 shows a partial perspective view of optical deflector 240 and waveguides 150b and 150c. Sub-layer 121c of component layer 121 has been omitted for visual clarity. As can be seen therein, variable reflector 250 further comprises a second side surface 256 and a third side surface 257 that are oriented substantially transverse to first side surface 254. A first electrode 258 is disposed on second side surface 256 and a second electrode 259 is disposed on third side surface 257. Electrodes 258 and 259 apply an electric field to body 255 of electro-optic material in relation to the first control signal. The electric field changes the refractive index of body 255, and both the field and the refractive index vary with the value of the first control signal. Electrodes 258 and 259 may be spaced from one another by a distance on the order of the width of the core body in waveguide 150c, typically ranging from 5 microns to 10 microns for single mode waveguides, and 25 microns to 50 microns for multimode waveguides. The electrodes may be made of tungsten to minimize reflections from their surfaces. Bodies 255 and 260 can be formed by conventional photolithographic methods. To achieve the bevel of interface surface 253, one may first form a rectangular strip of electro-optic material over layer 121b, thereafter form a metal mask for laser ablation, and then cut the bevel with laser ablation with the laser light at an angle (e.g., 45-degree angle) to the top surface of base substrate 122. Also, plasma etching through a tapered mask may be used, with the tapered mask comprising a photoresist that has been exposed through a gray-scale mask. Dicing using a blade with beveled edge is also possible. After interface surface 253 has been formed, body 260 may be formed and patterned by conventional process steps. Thereafter, the electrodes may be formed by conventional sputtering and etching steps.

Variable reflector 250 works as follows. We take the case of opto-electric device 135 comprising a light transmitter that directs a beam of light toward the top surface of component layer 121, and specifically toward top surface 251 and body 260 of high-refractive-index material. The intrinsic refractive index of body 255, the refractive index of body 260, and the bevel angle of interface surface 253 are selected such that interface surface 253 is near or at the initial point of total internal reflection (i.e., critical angle) for light emitted from the light transmitter (i.e., for light directed perpendicular to the top surfaces of layer 121 and base substrate 122). This selection can be done by the application of Snell's law and computer simulation programs available for purchase or on the Internet (e.g., http://www.physics.nwu.edu/ugrad/vpl/optics/snell.html). Then, by changing the refractive index of body 255, as directed by the first control signal, the majority of the light from device 135 can be reflected off interface surface 253 to the first end of waveguide 150c through side surface 254, or the majority of the light can be transmitted through the interface surface 253 to exit bottom surface 252, where it strikes angle reflector 245 and enters the first end of waveguide 150b. Also, the refractive index can be changed to cause the light to split at interface surface 253 such that approximately one-half is reflected to waveguide 150c and approximately one-half is transmitted to waveguide 150b.

In this manner, top surface 251 of variable reflector 250 acts as an optical input of deflector 240, the first side surface 254 acts as a first optical output of deflector 240, and bottom surface 252 and angled reflector 245 act as a second optical output of deflector 240. Furthermore, a first coupling efficiency is provided between the optical input and the first optical output, a second coupling efficiency is provided between the optical input and the second optical output, and the variation in the refractive index of electro-optic body 255 enables the relative values of these coupling efficiencies to change in relation to the state of the first control signal. The first coupling efficiency may be greater than the second coupling efficiency in one state of the first control signal, less than the second coupling efficiency in a second state, and substantially equal to the second coupling efficiency in a third state.

We give the following example. Body 255 has a refractive index of 1.39 with no electric field. The refractive index can be changed to a value of 1.38 with the application of negative voltage to electrode 258 with respect to electrode 259, and can also be changed to a value of 1.41 with the application of positive voltage to electrode 258 with respect to electrode 259. On the other hand, body 260 has a refractive index of 1.95 (40% higher than the intrinsic refractive index of body 255). When body 255 is caused to have a refractive index of 1.38, 78% of the light is reflected off interface surface 253 to waveguide 150c and 22% is transmitted through the surface to waveguide 150b. In this state, the first coupling efficiency is 78% and is greater than the second coupling efficiency (22%). When body 255 is caused to have a refractive index of 1.39, 48% of the light is reflected off interface surface 253 to waveguide 150c and 52% is transmitted through the surface to waveguide 150b. In this state, the first coupling efficiency is 48% and is substantially equal to the second coupling efficiency (52%). And when body 255 is caused to have a refractive index of 1.41, 30% of the light is reflected off interface surface 253 to waveguide 150c and 70% is transmitted through the surface to waveguide 150b. In this state, the first coupling efficiency is 30% and is less than the second coupling efficiency (70%). In general, the photo-detectors that receive this light can be designed such that a value of 30% lies below the detection threshold of the photo-detector, and that a value of 50% lies above the detection threshold. The first control signal may have three states to select among the three above divisions of the light beam from device 135.

The high-refractive-index material for body 260 may be provided by the OptiNDEZ A14 material manufactured by Brewer Science Inc. This is a pure polymer-based material. As another option, one may use a conventional polymer that has been loaded with micro particles of a high-refractive crystal, such as sapphire. The electro-optical material in the above example may be a chromophoric organic electro-optic material from Lumera, or one described in U.S. Pat. No. 6,716,995 or other recent patents disclosing new polymers with high electro-optic coefficients. Currently, one can readily obtain a polymer-based electro-optic material with an electro-optic coefficient of about 120 picometers per volt, which can yield a change from 1.39 to 1.405 with the application of about 92 volts per micron between electrodes 258 and 259. A high voltage driver chip would be needed to drive the electrodes, and such chips are commercially available. The first control signal may be provided as an input to such a chip to generate a voltage amplified version thereof. In the near future, it is expected that the chromophoric organic electro-optic materials will have coefficients of several hundred picometers per volt, which will significantly reduce the voltage that needs to be applied across electrodes 258 and 259.

In the above cases where 52% and 70% of the light is transmitted through to angled reflector 245, the transmitted light beam makes an angle of between 38 degrees and 33 degrees with a line vertical to the top surface of substrate 122. This is an average angle of approximately 35 degrees. With this average angle, angled reflector 245 should be disposed to the side of interface surface 253 to receive the angled light, and the beveled surface of angled reflector 245 should be around 27.5 degrees (which is less than 45 degrees by half the value of 35 degrees). The average angle of 35 degrees (and the range from 38 degrees to 33 degrees) can be reduced by disposing high refractive index material between the bottom surface 252 of variable reflector 250 and angled reflector 245.

While optical deflector 240 has been described with opto-electric device 135 being a light transmitter, it may be appreciated that device 135 may be a light receiver, and that the direction of light in deflector 240 may be reversed. In other words, each of waveguides 150b and 150c may couple light beams to the interface surface 253, and a majority of one of the light beams may be coupled to device 135 based on the refractive index of electro-optic body 255. In this case, top surface 251 of variable reflector 250 acts as an optical output of deflector 240, the first side surface 254 acts as a first optical input of deflector 240, and bottom surface 252 and angled reflector 245 act as a second optical input of deflector 240. Furthermore, a first coupling efficiency is provided between the first optical input and the optical output, a second coupling efficiency is provided between the second optical input and the optical output, and the variation in the refractive index of electro-optic body 255 enables the relative values of these coupling efficiencies to change in relation to the state of the first control signal in the same manner as the coupling efficiency changed in the above case where the light flowed in the opposite direction. (In other words, optical deflector 240 is a linear system.) The first coupling efficiency may be greater than the second coupling efficiency in one state of the first control signal, less than the second coupling efficiency in a second state, and substantially equal to the second coupling efficiency in a third state.

In FIGS. 4 and 5, the top surface of high-refractive body 260 has been shown to be substantially parallel to the top surfaces of component layer 121 and base substrate 122. However, the top surface of body 260 may be inclined to create a more shallow incident angle of light from device 135 onto interface surface 253. In this case, interface surface 253 would be inclined at an angle of less than 45 degrees with respect to the top surface of base substrate 122.

As another variation, interface surface 253 can be inclined at an angle substantially greater than 45 degrees with respect to the top surface of base substrate 122, such as 50 degrees and 55 degrees. This would enable one to achieve the initial point of total internal reflection with less of a difference between the refractive indices of bodies 255 and 260. However, the steeper angle causes the light reflected from interface surface 253 to angle downward into component layer 121 toward base substrate 122, rather than being substantially parallel to the top surface of base substrate 122. This can be addressed by positioning waveguide 150c at a level in component layer 121 that is lower than that shown in FIGS. 4 and 5, so that the left end of the waveguide can capture the downward-angled light. If needed, an angled deflector similar to that of angled deflector 245 can be positioned at the left end of waveguide 150c, or, more simply, the face of high-refractive body 260 at first side surface 254 may be beveled in order to bend the light from interface surface 253 to a horizontal direction or more a horizontal direction when it exits surface 254.

Claims of the present application encompass the above variations.

Figure 6:
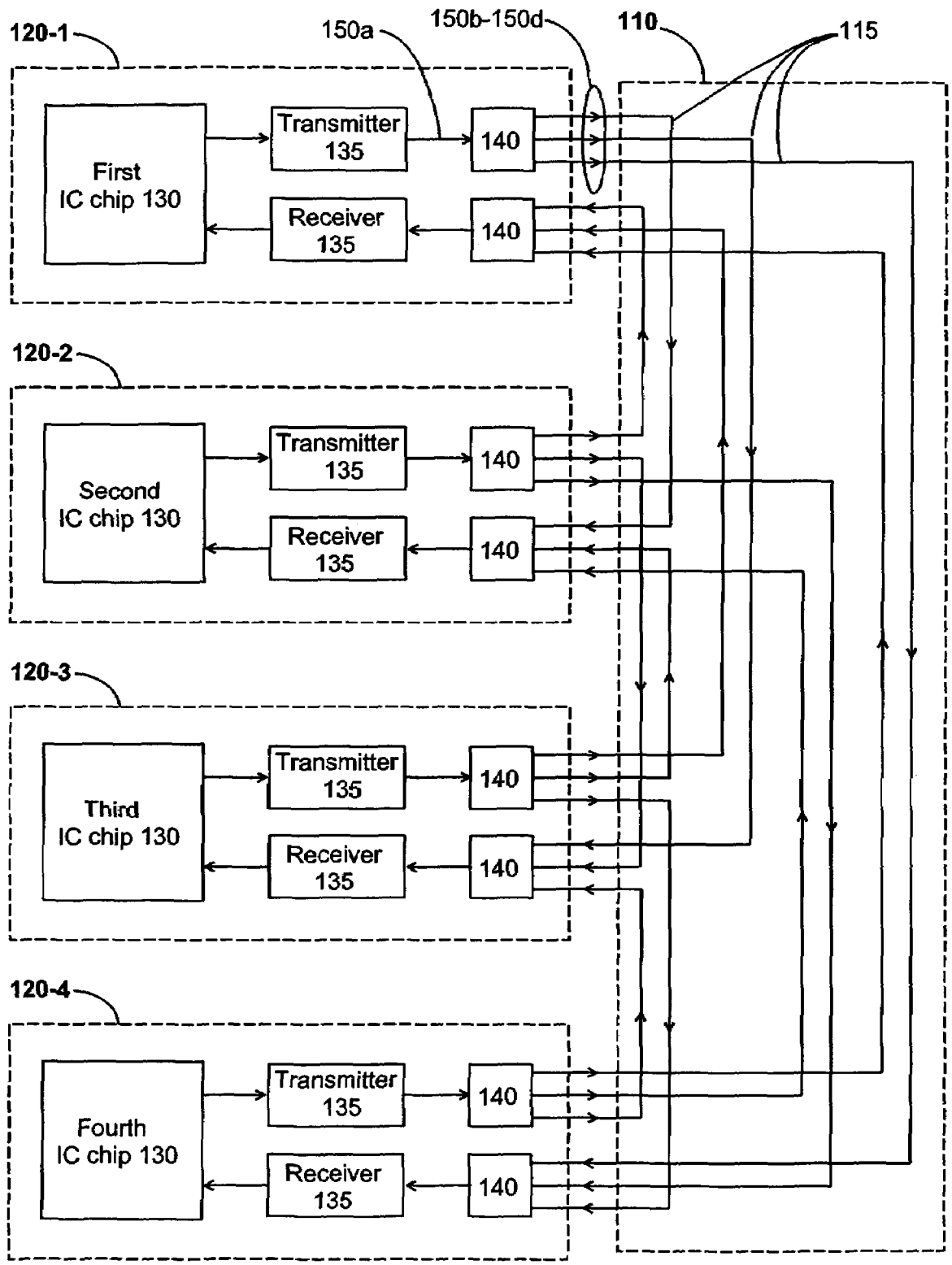
FIG. 6 shows a schematic diagram of an exemplary optical wiring architecture that may be used in the processor shown in FIG. 1 according to the present invention.

Having thereby described exemplary embodiments of deflector 140 and waveguides 150, we return to the global view of the processor shown in FIG. 1. As we indicated before, optical connections between each of the boards may be configured by deflectors 140, with optical routing done through main optical backplane 110. In FIG. 6, we show a schematic diagram of the optical wiring architecture that may be used in processor 100, which shows one way in which the optical waveguides 115 of backplane 110 may be interconnected with waveguides 150b-150d. The four component boards are indicated at reference numbers 120-1 through 120-4. At each end of waveguide 115, a mirror or grating element is placed to optically couple the end of the waveguide to one of waveguides 150b-150d in a component board. Twelve optical interconnects are provided, two interconnects between each pair of component boards 120 (one transmission and one reception). Only eight waveguide channels are needed in backplane 110 to implement the twelve interconnects since the six shortest optical interconnects may all be placed in two waveguide channels. Only one pair of a light transmitter and a light receiver is shown for each component board 120 in FIG. 6 for visual clarity. In practice, each board would have multiple pairs of transmitters/receivers, and the wiring diagram shown in FIG. 6 would be duplicated for each additional pair. As an alternative to the architecture shown in FIG. 6, one can use optical bus waveguides for waveguides 115, each of which has a bidirectional optical coupler to each component board. This would reduce the number of waveguides 115 to four (one for the receiver of each component board). However, bidirectional optical couplers often degrade the optical signal as it propagates through the waveguide, and so signal strength in the waveguide may become an issue.

While we have focused the description on board-to-board interconnects, it may be appreciated that the optical communications described herein may be applied within a single board, such as chip-to-chip communications. Claims of the present application encompass this application as well. In addition, one may place some or all of deflectors 140 in main optical backplane 110, with control signals for the deflectors being generated within backplane 110 and/or within the component substrates. Also, one may place some or all of the deflectors on intermediate boards that interface between the component boards 120 and main optical backplane 110. Claims of the present application encompass these variations as well.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A processor comprising:
at least a first IC chip located on a first substrate, a second IC chip located on a second substrate, and a third IC chip located on a third substrate;
a first light transmitter located on the first substrate, and adapted to receive a first electrical signal from the first IC chip and to generate an optical signal at an optical output in relation to the first electrical signal;

a first light receiver located on the second substrate, the first light receiver having an optical input and being adapted to generate a second electrical signal in relation to the amount of light received at its optical input, the second electrical signal being electrically coupled to the second IC chip;

a second light receiver located on the third substrate, the second light receiver having an optical input and being adapted to generate a third electrical signal in relation to the amount of light received at its optical input, the third electrical signal being electrically coupled to the third IC chip; and a first optical deflector having an optical input coupled to the optical output of the first light transmitter to receive an optical signal therefrom, a first optical output optically coupled to a first output waveguide that enables light to be conveyed to the first light receiver, a second optical output optically coupled to a second output waveguide that enables light to be conveyed to the second light receiver, and an electrical input configured to receive a first control signal in electrical form from an IC chip located on the first substrate, the first optical deflector adapted to couple the optical signal received at its optical input more to its first optical output than its second optical output when the first control signal from the IC chip located on the first substrate has a first state, and more to its second optical output than its first optical output when the first control signal from the IC chip located on the first substrate has a second state.

2. The processor of claim 1 wherein the first control signal is generated by the first IC chip.

3. The processor of claim 1 wherein the first IC chip is disposed on a first substrate, and wherein the first control signal is generated by fifth IC chip disposed on the first substrate.

4. The processor of claim 3 wherein said second IC chip transmits a second control signal to the fifth IC chip requesting that the first control signal be generated in its first state.

5. The processor of claim 4 wherein the second control signal is in electrical form.

6. The processor of claim 1 further comprising:
a second light transmitter;
a second optical deflector having a first optical input optically coupled to a waveguide that enables light to be conveyed from the first light transmitter, a second optical input optically coupled to a waveguide that enables light to be conveyed from the second light transmitter, an optical output optically coupled to the optical input of the first light receiver, a first optical coupling efficiency between its first optical input and its optical output, a second optical coupling efficiency between its second optical input and its optical output, and an electrical input to receive a second control signal in electrical form, the second optical deflector adapted to make the first optical coupling efficiency greater than the second optical coupling efficiency when the second control signal has a first state, and further adapted to make the second optical coupling efficiency greater than the first optical coupling efficiency when the second control signal has a second state.

7. The processor of claim 1 wherein the first optical deflector comprises:
an input waveguide having a first end for receiving light from the first light transmitter and a second end; and a prism deflector having a first optical surface facing towards the second end of the input waveguide to receive light therefrom, a second optical surface to enable light to exit the prism deflector in a plurality of directions, a body of opto-electric material disposed between the first and second optical surfaces, and at least one electrode electrically coupled to the electrical input to receive the first control signal from an IC chip, wherein the at least one electrode is disposed between the first and second optical surfaces on a surface of the body of opto-electric material; and wherein the first output waveguide has a first end facing towards the second optical surface of the prism deflector and a second end; and wherein the second output waveguide has a first end facing towards the second optical surface of the prism deflector and a second end.

8. The processor of claim 7 further comprising a reflector disposed at the first end of the input waveguide.

9. The processor of claim 1 wherein the first optical deflector, the first output waveguide, and the second output waveguide are disposed on a common substrate;
wherein the first output waveguide has a first end, a second end, and an optical propagation axis;
wherein the second output waveguide is disposed above the first output waveguide and has a first end, a second end, and an optical propagation axis, the first end being closer to the first end of the first output waveguide than the second end of the first output waveguide; and
wherein the first optical deflector comprises:
an angled reflector disposed to couple light to the first end of the first output waveguide and having a beveled surface with respect to the optical propagation axis of the first output waveguide; and
a variable reflector having a top surface disposed to receive light from the light transmitter, a bottom surface, and a first side surface positioned to couple light toward the first end of the second output waveguide, the variable reflector further having a first body of electro-optic material disposed between the top and bottom surfaces of the variable reflector, a second body of material disposed between the top and bottom surfaces of the variable reflector and further disposed between the first body of electro-optic material and the first side surface, and an interface surface between the first and second bodies, the interface surface forming a bevel angle with respect to the optical propagation axis of the second output waveguide, the second body of material having a refractive index that is higher than the intrinsic refractive index of the first body of material, the variable reflector further comprising at least one electrode electrically coupled to the electrical input to receive the first control signal from an IC chip and located to generate a corresponding electric field in first body of electro-optic material; and
wherein the variable reflector is adapted to couple the light received from the light transmitter more to its bottom surface than its first side surface when the first control signal has a first state, and more to its first side surface than its bottom surface when the first control signal has a second state; and
wherein the first end of the second output waveguide is disposed to receive light emitted from the side surface of the variable reflector; and wherein the angled reflector is disposed to receive light emitted from the bottom surface of the variable reflector.

10. The processor of claim 6 wherein the second optical deflector is further adapted to make the first optical coupling efficiency substantially equal to the second optical coupling efficiency when the electrical control signal has a third state.

11. The processor of claim 9 wherein the optical deflector receives light at the top surface of the variable reflector,
   wherein the variable reflector couples the received light received more to its bottom surface than its first side surface when the control signal has a first state, and more to its first side surface than its bottom surface when the control signal has a second state; and
   wherein the first end of the second waveguide is disposed to receive light emitted from the first side surface of the variable reflector, and
   wherein the angled reflector is disposed to receive light emitted from the bottom surface of the variable reflector.

12. The processor of claim 9 wherein the variable reflector has a first optical coupling efficiency between the top surface of the variable reflector and the first side surface of the variable reflector, and a second optical coupling efficiency between the top surface of the variable reflector and the bottom surface of the variable reflector, wherein the variable reflector is adapted to make the first optical coupling efficiency greater than the second optical coupling efficiency when the control signal has a first state, and is further adapted to make the second optical coupling efficiency greater than the first optical coupling efficiency when the control signal has a second state.

13. The optical deflector of claim 12 wherein the variable reflector makes the first optical coupling efficiency substantially the same as the second optical coupling efficiency when the control signal has a third state.

14. The processor of claim 9 wherein the interface surface is planar.

15. The processor of claim 9 wherein the bevel angle is between 43 degrees and 47 degrees.

16. The processor of claim 9 wherein the variable reflector further comprises a second side surface, a third side surface, and a second electrode, wherein the at least one electrode is disposed on the second side surface adjacent to the first body of electro-optic material, and wherein the second electrode is disposed on the third side surface adjacent to the first body of electro-optic material.

17. The processor of claim 9 wherein the refractive index of the second body of material is higher than the intrinsic refractive index of the first body of material by at least 10%.

18. The processor of claim 9 wherein the refractive index of the second body of material is higher than the intrinsic refractive index of the first body of material by at least 20%.

19. The processor of claim 9 wherein the refractive index of the second body of material is higher than the intrinsic refractive index of the first body of material by at least 25%.

* * * * *